April 21, 1964　　J. A. ROBERTS　　3,129,729
LEAK STANDARD
Filed Aug. 31, 1961

INVENTOR.
JOHN A. ROBERTS
BY
*Irving M. Freedman*
HIS ATTORNEY

United States Patent Office

3,129,729
Patented Apr. 21, 1964

3,129,729
LEAK STANDARD
John A. Roberts, Lynnfield Center, Mass., assignor to General Electric Company, a corporation of New York
Filed Aug. 31, 1961, Ser. No. 135,319
5 Claims. (Cl. 141—18)

The subject invention relates to a leak standard suitable for calibrating and/or testing electrical vapor or leak detectors of the type described in U.S. patent 2,550,498, granted April 24, 1951, on application Ser. No. 754,657, filed June 14, 1947, by Chester W. Rice, and more particularly, to an uncomplex, refillable leak standard.

The aforementioned patent, which is assigned to the same assignee as the present application, describes an arrangement for detecting the presence of certain substances or impurities in gases, such as halogen tracer gases, by passing the mixture between the electrodes of a sensitive element and noting variations in current flow between the electrodes due to variations in ion formation in the presence of the impurities or tracer gases. Such tracer gases may be introduced under pressure into closed systems and the exterior of the systems probed with the suction probe of the leak detector to detect the presence of tracer gases which leak through the container to indicate the location of leaks. In evacuated systems, the detecting element or sensitive element may be located within the evacuated system and the exterior joints or areas suspected of leakage probed with a tracer gas.

In order to obtain a quantitative evaluation of the magnitude of a leak, the response of the detector to the tracer gas must be calibrated against a standard or reference leak of tracer gas. Also, in repairing or adjusting leak detector equipment it is necessary and/or desirable to utilize a standard tracer gas leak having a known magnitude.

Since the tracer gas most commonly employed for detecting leaks is a halogen compound, the apparatus has been commonly referred to as a halogen leak detector. Commercial forms of halogen leak detectors are very sensitive instruments and will provide an indication for leak rates as small as 1/100 of an ounce per year.

Prior leak standards have for the most part been either of the complex, expensive, high-precision type or of a low-cost, nonrefillable type of relatively low accuracy.

It is an object of the present invention to provide a leak standard for supplying predetermined minute quantities of a tracer gas or vapor for use in calibrating or servicing electronic leak detectors.

It is a further object of the present invention to provide an improved low-cost leak standard which is uncomplex in structure and capable of being refilled.

It is another object of the present invention to provide an improved leak standard of relatively small size and weight and adapted for portable use.

Further objects and advantages of the invention will become apparent as the following description proceeds and the features of novelty which characterize the invention will be pointed out with particularity in the claims annexed to and forming a part of this specification.

In accordance with one form of the invention, a rechargeable or refillable leak standard is provided comprising an enclosure having a discharge tube and a threaded aperture passing through the enclosure. A threaded pressure gauge valve assembly cooperates with the threaded aperture for selective movement toward and away from the interior of the housing. The pressure gauge valve assembly is rotatable a sufficient amount to selectively open the charging passageway which passes through the threaded aperture to the interior of the housing during charging. The charging passageway is closed after charging by rotation of the pressure gauge valve assembly in the opposite direction. The pressure gauge indicates the leak rate through the discharge tube.

More particularly, the discharge tube comprises a capillary tube having selective covering means at the outer end and the pressure gauge is calibrated relative to a predetermined leak rate. At least two separated O-rings are interposed between the capillary tube and the enclosure with the region between the O-rings being vented to the outside of the enclosure remote from the outer end of the capillary tube to by-pass any leakage and prevent it from appearing in the region of the outlet end of the capillary tube.

For a better understanding of the invention, reference may be had to the following specification, taken in view of the accompanying drawings in which.

Figure 1:
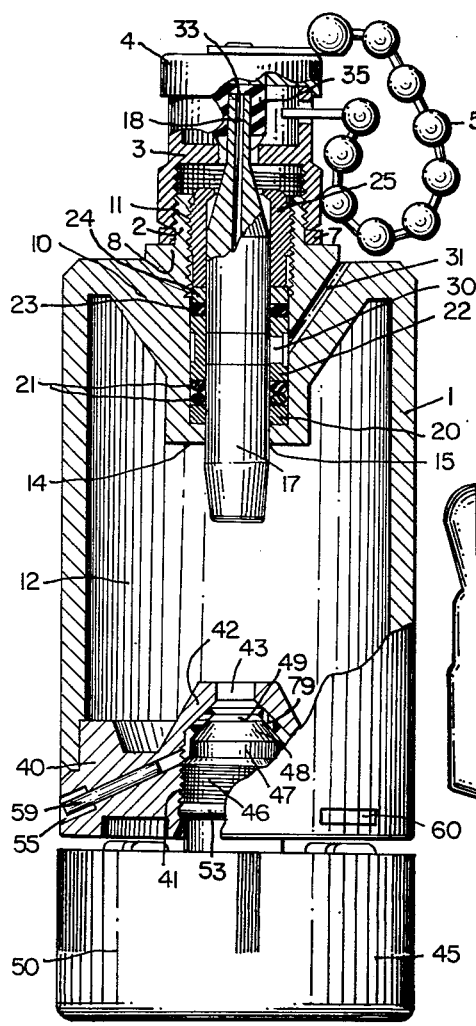
FIG. 1 is an elevation view, partially in cross-section, showing a leak standard incorporating the invention.
Figure 2:
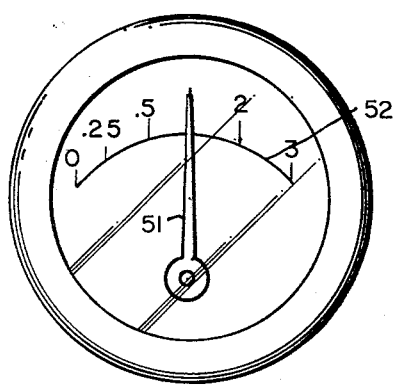
FIG. 2 is the bottom view of the arrangement shown in FIG. 1.
Figure 3:
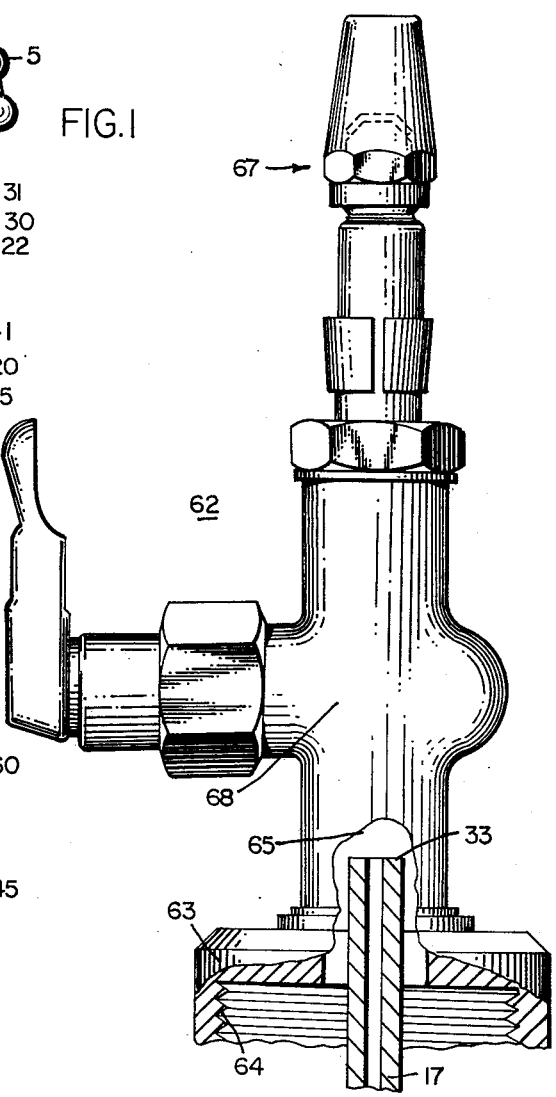
FIG. 3 illustrates an alternate embodiment of a portion of the arrangement shown in FIG. 1.

Referring to FIGS. 1 and 2, the housing 1 has a generally right circularly cylindrical form and includes an upper threaded portion 2. An internally threaded protective extension member 3 is secured to the threaded portion 2. A cap or cover 4 is provided to selectively close the end of the extension member 3 and is permanently secured thereto by a beaded chain 5 of sufficient length to enable the selective opening or closing of the extension member. The threaded fitting between the extension member 3 and the upper threaded portion 2 of the housing 1 is separated by a spacer 7 interposed between the lower end of the extension member and the upper surface of the shoulder 8 of housing 1. An internally depending tapered portion 10 of the housing 1 provides an axial bore 11 from the interior 12 of the housing through the upper threaded portion 2 to the interior of the protective extension member 3. The depending tapered portion 10 terminates in a bottom surface 14 having a central aperture 15 therein.

A glass capillary tube 17 having a predetermined bore 18 extends from the interior 12 of the enclosure 1 through the aperture 15 past the tapered portion 10 to the region within the extension member 3. The capillary 17 is maintained in position and forms a gas-tight connection with the tapered portion 10 through the following members positioned above the bottom 14 of the tapered portion and between the tapered portion and the capillary: a washer 20, a pair of O-ring seals 21, a spacer assembly 22, an O-ring seal 23, a Teflon antifriction washer 24, and a metal bushing 25 having external threads which cooperate with the internal threads formed at the upper end of the interior of the depending tapered portion 10. The arrangement may be readily assembled by inserting the elements 20 through 24 in the proper sequence and clamping them together between the bottom 14 of the tapered portion 10 and the cap 25 by rotating the cap 25 in the proper direction. The arrangement may be readily disassembled by the reverse procedure. The pressure exerted on the O-rings upon assembly causes them to flatten in an axial direction securely clamping the capillary 17 in position and making the arrangement gas tight.

Spacer assembly 22 includes an axial groove 30 communicating with a passageway 31 which leads to the exterior of the enclosure 1 to vent or bleed any gas leakage from the interior of the enclosure which might by-pass the O-rings 21. This prevents such leakage from appearing within the extension member 3 in the region of the outlet 33 of the capillary bore 18. A rubber insert or member 35 secured to the interior of cover 4 surrounds and seals the outlet end of the capillary 17 when the cover is used to close the end of extension member 3.

The bottom member 40 of the enclosure 1 includes a centrally located threaded aperture 41 having an inwardly tapered end portion 42 at the inner end surrounding a through passageway 43. A pressure gauge valve assembly 45 is rotatably mounted within the threaded aperture 41 through the cooperation of the externally threaded portion 46 of the valve 47. Inwardly tapered portion 48 of the valve 47 cooperates with a valve seat 79 associated with the inwardly tapered end portion 42 of the bottom member 40 to enable the selective closing of the through passageway 43. The central portion 49 of the inner end of the valve 47 is exposed to the pressure within the enclosure 1 and communicates with a conventional pressure gauge 50 of the pressure gauge valve assembly 45 positioned below the bottom member 40 of the enclosure 1. The pointer 51, shown in FIG. 2, cooperates with scale indicia 52 to indicate the pressure and/or leak rate provided through the capillary 17. A filling tube 59 extends from a recess 55 in the outer surface of the bottom member 40 to the interior of the enclosure 1 through the threaded aperture 41 and through passageway 43.

To fill or refill the enclosure 1 with a tracer gas the pressure gauge valve assembly 45 is rotated away from the enclosure 1 so that the valve 47 moves away from the tapered end portion 42 and valve seat 49 to connect the filling tube or charging passageway 59 to the interior of the enclosure 1 through the threaded aperture 41 and the through passageway 43. An O-ring seal 53 interposed between the valve 47 and the aperture 41 prevents leakage from the interior 12 of the housing 1 through the aperture 41. After the enclosure is charged, the pressure gauge valve assembly is rotated in the opposite direction to drive the tapered portion 48 of the valve assembly into contact with the valve seat 79 to seal the interior from the charging passageway 59. Thus, the pressure gauge valve assembly 45 functions to selectively connect the charging passageway 59 to the interior of the enclosure 1 in addition to providing an indication of the pressure within the enclosure.

Since the leak rate provided through the capillary 17 is dependent upon the pressure within the enclosure 1, the scale 52 of the pressure gauge 50 may be directly calibrated in the leak rate for a given capillary. Alternatively, as indicated in FIG. 2, the pressure gauge may be calibrated in terms of a correction factor which is multiplied by a predetermined rate provided by the capillary used when the pressure is at a value indicated by the scale point 1. The predetermined leak rate for the leak standard may be marked such as by the indicia 60 on the exterior of the enclosure 1. If the leak standard is filled to a pressure corresponding with the numeral 1 on scale 52, the leak rate will be that indicated by the indicia 60. However, if the pressure within the enclosure 1 is greater than that which would position the pointer 51 at the numeral 1, the pointer will be deflected clockwise to indicate a multiplication or correction factor greater than 1. Conversely, if the pressure is below that indicated by the numeral 1, the correction factor by which the leak rate indicated by the indicia 60 is to be multiplied will be less than one.

In use, the cover 4 is removed and the probe of the leak detector being calibrated is brought close to or around the outlet 33 of the capillary 17. While such an arrangement is suitable for use in leak detectors designed for the detection of leaks in pressurized systems, if the leak standard is to be utilized with leak detectors designed for use in vacuum systems, the cover 4 and the extension member 3 may be replaced by the valve assembly 62 shown in FIG. 2.

Referring to FIG. 2, the valve assembly 62 includes a connecting portion 63 having internal threads 64 which cooperate with the upper threaded portion 2 of enclosure 1. A central passageway 65 surrounds the outlet 33 of the capillary tube 17. The other end of the valve assembly 62 contains suitable gas-tight connections indicated generally as 67 to selectively connect in a gas-tight manner the leak standard to the vacuum system including the leak detector being tested or calibrated. The manually operated valve 68 is interposed between the fittings 67 and the lower connecting portion 63 of the valve assembly in order to selectively connect capillary 17 to the vacuum system while maintaining the arrangement gas tight relative to the surrounding atmosphere.

While particular embodiments of the subject invention have been shown and described herein, they are in the nature of description rather than limitation, and it will occur to those skilled in the art that various changes, modifications and combinations may be made within the province of the appended claims without departing either in spirit or scope from this invention in its broader aspects.

What I claim as new and desire to secure by Letters Patent of the United States is:

1. A rechargeable leak standard comprising: an enclosure, a discharge tube passing into said enclosure, said discharge tube having a predetermined leak rate when the contents of said enclosure are under a predetermined pressure, an aperture passing into said enclosure, said aperture having an outer threaded portion and an inner portion, a charging passageway extending from the exterior of said enclosure to intersect said aperture at a point intermediate said inner and outer portions, and a threaded pressure gauge assembly threaded into and cooperating with said threaded portion for selective movement toward and away from the interior of said enclosure, said pressure gauge assembly having means cooperating with said inner portion to selectively connect said charging passageway to the interior of said enclosure when said assembly is rotated so that said means moves out of contact with said inner portion during charging and to selectively close said connection when said assembly is rotateed so that said means is in contact with said inner portion after charging, said connecting means having means to put the pressure gauge in communication with the interior of said enclosure to thereby indicate the leak rate through said discharge tube.

2. A rechargeable leak standard comprising: an enclosure, a capillary discharge tube passing into said enclosure, said discharge tube having a predetermined leak rate when the contents of said enclosure are under a predetermined pressure, an aperture passing into said enclosure, said aperture having an outer threaded portion and an inner portion carrying a valve seat, a charging passageway extending from the exterior of said enclosure to intersect said aperture the point intermediate said outer threaded portion and said valve seat, and a threaded pressure gauge valve assembly threaded into and cooperating with said threaded portion for selective movement toward and away from the interior of said enclosure, said pressure gauge valve assembly having a valve to cooperate with said valve seat to selectively connect said charging passageway to the interior of said enclosure when said valve is opened by rotating said assembly during charging and to selectively close said connection when said valve is closed after charging, said valve having means to couple the pressure gauge to the interior of said enclosure when said valve is closed to thereby indicate the leak rate through said discharge tube.

3. A rechargeable leak standard comprising: an enclosure, a capillary discharge tube passing into said enclosure, said discharge tube having a predetermined leak rate when the contents of said enclosure are under a predetermined pressure, an aperture passing into said enclosure, said aperture having an outer threaded portion and an inner portion carrying a valve seat, a charging passageway extending from the exterior of said enclosure to intersect said aperture the point intermediate said outer threaded portion and said valve seat, a threaded pressure gauge valve assembly threaded into and cooperating with said threaded portion for selective movement toward and away from the interior of said housing enclosure, said pressure gauge valve assembly having a valve to cooperate with said valve seat to selectively connect said charging passageway to the interior of said enclosure when said valve is opened by rotating said assembly during charging and to selectively close said connection when said valve is closed after charging, and means interposed between said assembly and said outer portion of said aperture to prevent leakage to the atmosphere through the mating threads of said assembly and said outer portion during the charging of said enclosure, said valve having means to couple the pressure gauge to the interior of said enclosure when said valve is closed to thereby indicate the leak rate through said discharge tube.

4. A rechargeable leak standard comprising: an enclosure, a capillary discharge tube passing into said enclosure, means to selectively open and close the outer end of said discharge tube to the atmosphere, said discharge tube having a predetermined leak rate when the contents of said enclosure are under a predetermined pressure, an aperture passing into said enclosure, said aperture having an outer threaded portion and an inner portion carrying a valve seat a charging passageway extending from the exterior of said enclosure to intersect said aperture at a point intermediate said inner and outer portions, and a threaded pressure gauge valve assembly threaded into and cooperating with said threaded portion for selective movement toward and away from the interior of said enclosure, said pressure gauge valve assembly having a valve to cooperate with said valve seat to selectively connect said charging passageway to the interior of said enclosure when said valve is opened by rotating said assembly away from the interior of said enclosure during charging and to selectively close said charging passageway when said valve is closed by rotating said assembly after charging, said valve having means to couple the pressure gauge to the interior of said enclosure when said valve is closed to thereby indicate the leak rate through said discharge tube relative to said predetermined amount.

5. A rechargeable leak standard comprising: an enclosure, a capillary discharge tube passing into said enclosure, means to selectively open and close the outer end of said discharge tube to the atmosphere, said discharge tube having a predetermined leak rate when the contents of said enclosure are under a predetermined pressure, an aperture passing into said enclosure, said aperture having an outer threaded portion and an inner portion carrying a valve seat a charging passageway extending from the exterior of said enclosure to intersect said aperture intermediate said inner and outer portions and a threaded pressure gauge valve assembly threaded into and cooperating with said threaded portion for selective movement toward and away from the interior of said enclosure, said pressure gauge valve assembly having a valve to cooperate with said valve seat to selectively connect said charging passageway to the interior of said enclosure when said valve is opened by rotating said assembly during charging and to selectively close said connection when said valve is closed after charging, said valve having means to couple the pressure gauge to the interior of said enclosure when said valve is closed to thereby indicate the leak rate through said discharge tube relative to said predetermined amount, said discharge tube being sealed from the portion of the enclosure through which it passes by at least two separated seals with a passageway leading from between the seals to the outside of the enclosure at a region remote from the outlet end of said discharge tube to by-pass any leakage therefrom.

References Cited in the file of this patent

UNITED STATES PATENTS

| | | |
|---|---|---|
| 1,332,520 | Richard et al. | Mar. 2, 1920 |
| 1,691,374 | Birkenmaier | Nov. 13, 1928 |
| 2,274,233 | Dewald | Feb. 24, 1942 |
| 2,453,391 | Whittingham | Nov. 9, 1948 |
| 2,666,297 | Skousgaard | Jan. 19, 1954 |